(12) United States Patent
Kusakabe et al.

(10) Patent No.: US 9,654,319 B2
(45) Date of Patent: May 16, 2017

(54) NON-CONTACT COMMUNICATION APPARATUS

(71) Applicant: QUADRAC CO., LTD., Tokyo (JP)

(72) Inventors: Susumu Kusakabe, Tokyo (JP); Fumio Kubono, Tokyo (JP); Masanobu Sato, Tokyo (JP); Keiichi Nanbu, Tokyo (JP)

(73) Assignee: QUADRAC CO., LTD., Tokyo (JP)

( * ) Notice: Subject to any disclaimer, the term of this patent is extended or adjusted under 35 U.S.C. 154(b) by 0 days.

(21) Appl. No.: 14/897,750

(22) PCT Filed: Jun. 13, 2013

(86) PCT No.: PCT/JP2013/066292
§ 371 (c)(1),
(2) Date: Dec. 11, 2015

(87) PCT Pub. No.: WO2014/199477
PCT Pub. Date: Dec. 18, 2014

(65) Prior Publication Data
US 2016/0134450 A1 May 12, 2016

(51) Int. Cl.
*H03C 1/52* (2006.01)
*H04L 27/04* (2006.01)
(Continued)

(52) U.S. Cl.
CPC ........... *H04L 27/04* (2013.01); *H04B 5/0031* (2013.01); *H04B 5/0037* (2013.01); *H04W 4/008* (2013.01)

(58) Field of Classification Search
CPC ...................................................... H04L 27/04
(Continued)

(56) References Cited

U.S. PATENT DOCUMENTS

| 5,451,900 A * | 9/1995 | Haga | H03F 3/217 330/10 |
| 2009/0219138 A1* | 9/2009 | Forster | G06K 19/0723 340/10.1 |
| 2011/0311012 A1* | 12/2011 | Chen | H03L 7/087 375/376 |

OTHER PUBLICATIONS

Karibe, "Tokoton Yasashi Hisesshoku IC Card No Hon," third impression of the first edition, Nikkan Kogyo Shinbun, Ltd., Nov. 20, 2005, pp. 86-89 (3 pages), including English statement of relevance.

(Continued)

*Primary Examiner* — Lihong Yu
(74) *Attorney, Agent, or Firm* — Birch, Stewart, Kolasch & Birch, LLP

(57) ABSTRACT

Provided is a non-contact communication apparatus which uses a conventional IC chip without any change, while eliminating the need to transmit power to the IC chip and allowing an increase in communication range. A non-contact communication apparatus connectable to an IC chip includes an antenna section, a first detection section that retrieves a first detection signal from a signal received by the antenna section, an amplitude modulating section that amplitude-modulates a clock signal using the first detection signal retrieved by the first detection section and that inputs the amplitude-modulated signal to the IC chip, a second detection section that retrieves a second detection signal from an output signal from the IC chip, a load modulating section that load-modulates a carrier retrieved from the antenna section using the second detection signal retrieved by the second detection section and that inputs the load-modulated carrier to the antenna section, and a power supply section.

4 Claims, 2 Drawing Sheets

(51) Int. Cl.
*H04B 5/00* (2006.01)
*H04W 4/00* (2009.01)

(58) Field of Classification Search
USPC .......................................................... 375/300
See application file for complete search history.

(56) References Cited

OTHER PUBLICATIONS

Finkenzeller, "RFID Handbook", Fundamentals and Applications in Contactless Smart Cards, Radio Frequency Identification and Near-Field Communication, Third Edition, 2010, pp. 1-462 (480 pages).

\* cited by examiner

NON-CONTACT COMMUNICATION APPARATUS

TECHNICAL FIELD

The present invention relates to a non-contact communication apparatus such as a non-contact IC card.

BACKGROUND ART

A non-contact communication apparatus utilized at a ticket gate in a station and at a cash register in a supermarket transmits and receives data based on a load modulation scheme (NPL 1).

CITATION LIST

Non Patent Literature

NPL 1: Hiroshi Karibe, "Tokoton Yasashi Hisesshoku IC Card No Hon", third impression of the first edition, NIKKAN KOGYO SHINBUN, LTD., Nov. 20, 2005

SUMMARY OF INVENTION

Technical Problem

Conventional non-contact communication apparatuses need not only to transmit and receive signals but also to transmit power to an IC chip and thus fail to achieve significant load modulation. As a result, the conventional non-contact communication apparatuses are forced to use a short communication range.

Thus, an object of the present invention is to provide a non-contact communication apparatus that uses a conventional IC chip without any change, while eliminating the need to transmit power to the IC chip and allowing an increase in communication range.

Solution to Problem

According to the present invention, the above-described object is accomplished by the following means.

The present invention provides a non-contact communication apparatus connectable to an IC chip, the non-contact communication apparatus including an antenna section, a first detection section that retrieves a first detection signal from a signal received by the antenna section, an amplitude modulating section that amplitude-modulates a clock signal using the first detection signal retrieved by the first detection section and that inputs the amplitude-modulated signal to the IC chip, a second detection section that retrieves a second detection signal from an output signal from the IC chip, a load modulating section that load-modulates a carrier retrieved from the antenna section using the second detection signal retrieved by the second detection section and that inputs the load-modulated carrier to the antenna section, and a power supply section.

DESCRIPTION OF EMBODIMENTS

An embodiment of the present invention will be described below with reference to the attached drawings.

Figure 1:
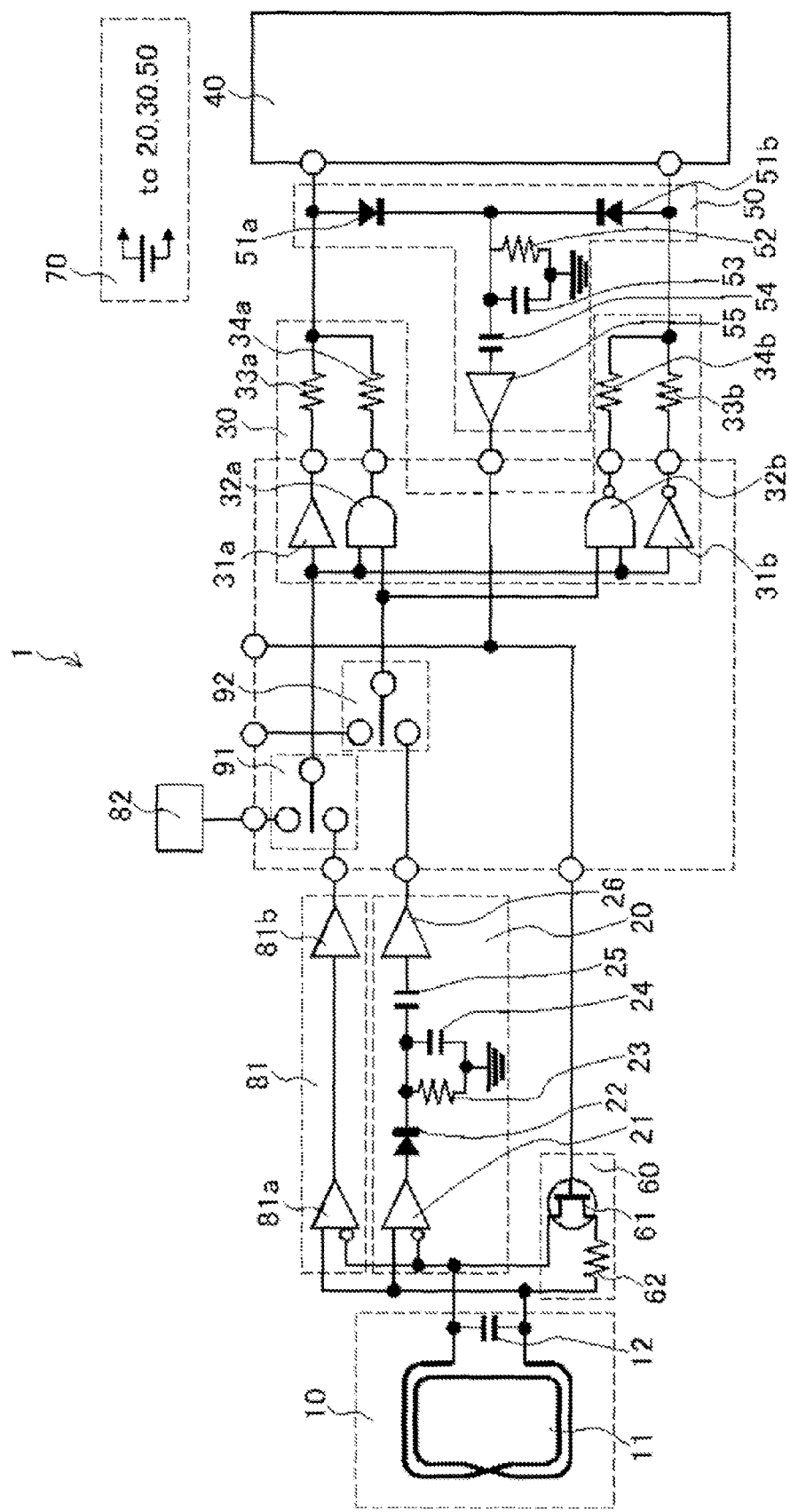
FIG. 1 is a schematic logic-circuit diagram of a non-contact communication apparatus according to an embodiment of the present invention.
Figure 2:
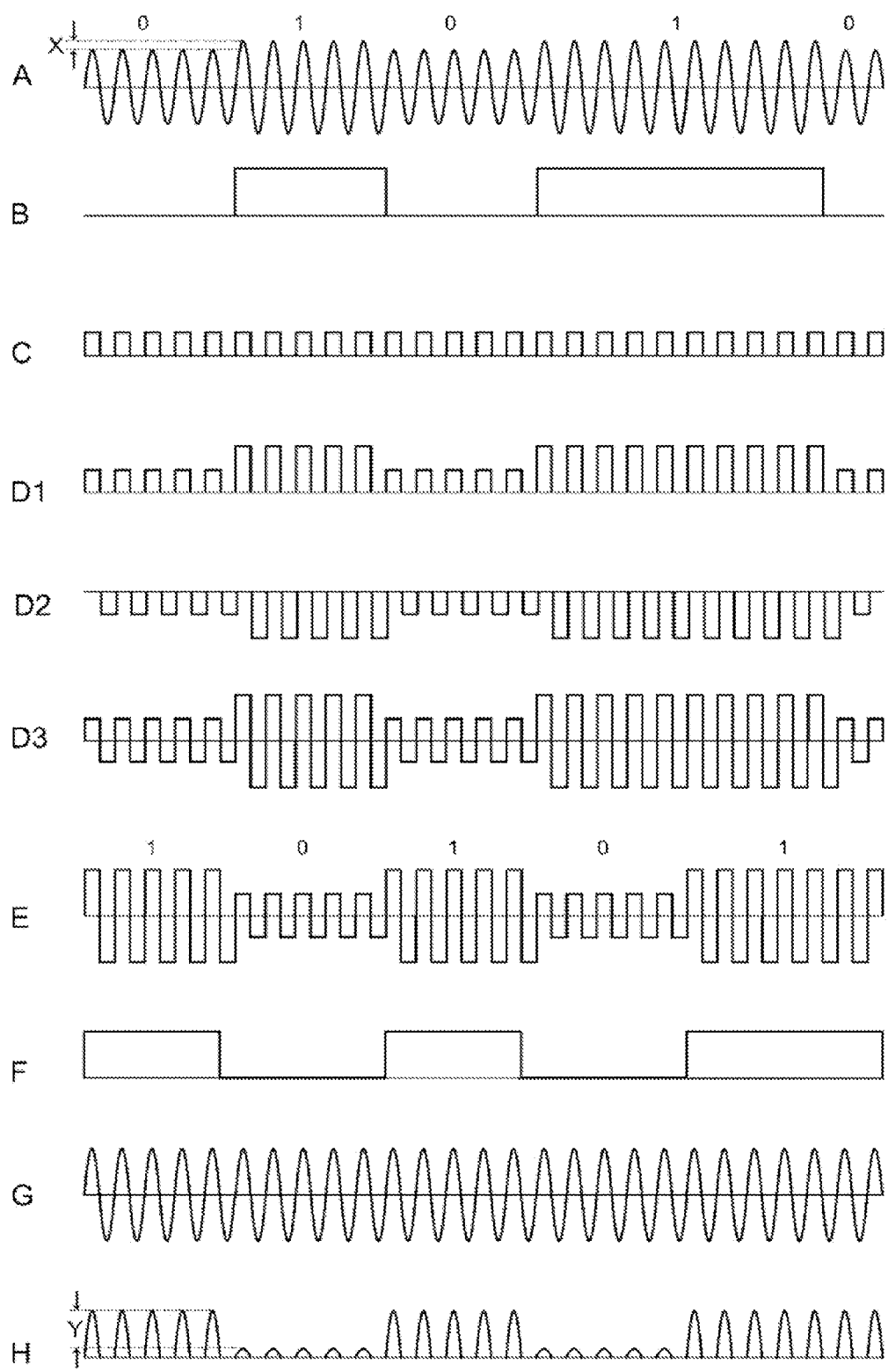
FIG. 2 is a schematic timing chart of the non-contact communication apparatus according to the embodiment of the present invention.

FIG. 1 is a schematic logic-circuit diagram of a non-contact communication apparatus according to the embodiment of the present invention. FIG. 2 is a schematic timing chart of the non-contact communication apparatus according to the embodiment of the present invention.

As depicted in FIG. 1, a non-contact communication apparatus 1 according to the embodiment of the present invention is a non-contact communication apparatus that can be connected to an IC chip 40 and includes an antenna section 10, a first detection section 20, an amplitude modulating section 30, a second detection section 50, a load modulating section 60, and a power supply section 70. These components will be described below in order. The non-contact communication apparatus 1 makes half-duplex communication with a reading apparatus (not depicted in the drawings).

[Antenna Section 10]

The antenna section 10 transmits and receives signals to and from the reading apparatus (a reader installed at a ticket gate in a station or a cash register in a supermarket). The antenna section 10 includes, for example, an antenna coil 11 and a capacitor 12 for tuning. The antenna section 10 transmits and receives signals using a magnetic field traversing the antenna coil 11.

[First Detection Section 20]

The first detection section 20 retrieves a first detection signal (FIG. 2: B) from a signal (FIG. 2: A) received by the antenna section 10. The first detection section 20 includes, for example, an amplifier 21, a detection diode 22, a resistor 23, capacitors 24 and 25, and a comparator 26. The first detection section 20 outputs "1" or "0" depending on whether a signal received by the antenna section 10 is higher or lower than a predetermined threshold. This output signal is the first detection signal.

The first detection section 20 operates using power supplied by the power supply section 70.

[Amplitude Modulating Section 30]

The amplitude modulating section 30 amplitude-modulates a clock signal (FIG. 2: C) using the first detection signal (FIG. 2: B) retrieved by the first detection section 20, and inputs the amplitude-modulated signal (FIG. 2: D3) to the IC chip 40.

The amplitude modulating section 30 is configured as a differential circuit and has, for example, a first circuit including a current buffer 31a, an AND input current buffer 32a, and resistors 33a and 34a, and a second circuit including an inverting current buffer 31b, an inverting AND input current buffer 32b, and resistors 33b and 34b. A signal depicted at D1 in FIG. 2 is output from the first circuit. A signal depicted at D2 in FIG. 2 is output from the second circuit. The IC chip 40 internally has an impedance, and as a result, an output signal from the amplitude modulating section 30 as a whole is a signal depicted at D3 in FIG. 2. The differential circuit is an example of the amplitude modulating section 30.

The amplitude modulating section 30 operates using power supplied by the power supply section 70.

[IC Chip 40]

The IC chip 40 receives the signal (FIG. 2: D3) amplitude-modulated by the amplitude modulating section 30, and outputs a response signal (FIG. 2: E).

The IC chip 40 has no power supply terminal and uses a signal received from the amplitude modulating section 30 to generate power to be used by the IC chip 40 and operate.

[Second Detection Section 50]

The second detection section 50 retrieves a second detection signal (FIG. 2: F) from the output signal (FIG. 2: E) from the IC chip 40. The second detection section 50 includes, for example, rectifier diodes 51a and 51b, a resistor 52, a capacitor 53, a capacitor 54, and a comparator 55. The second detection section 50 outputs "1" or "0" depending on whether the output signal from the IC chip 40 is higher or lower than a predetermined threshold. The output signal is the second detection signal.

The second detection section 50 operates using power supplied by the power supply section 70.

The second detection section 50 is connected to the IC chip 40 by wire, preventing a variation in input characteristics (examples: an SN ratio and an input level) for the signal output from the IC chip 40.

[Load Modulating Section 60]

The load modulating section 60 load-modulates a carrier (FIG. 2: G) received by the antenna section 10 using the second detection signal (FIG. 2: F) retrieved by the second detection section 50. The load modulating section 60 then inputs the load-modulated signal (FIG. 2: H) to the antenna section 10. The antenna section 10 transmits the load-modulated signal (FIG. 2: H). The load modulating section 60 includes an FET (Field Effect Transistor) 61 and a resistor 62.

If the resistor 62 is not provided, when the FET 61 is turned on, two differential inputs of a differential amplifier 81a are short-circuited. Therefore, a clock signal is not retrieved from a clock retrieving section 81 and power is not supplied to the IC chip 40. Accordingly, in the embodiment of the present invention, the resistor 62 is provided. However, the resistor 62 may have as small a resistance value as possible so as to allow significant load modulation to be applied. The resistor 62 may be omitted so long as the FET 61 has an on resistance needed for preventing the short-circuit. As long as the clock signal can be retrieved from the clock retrieving section 81, the resistance of the resistor 62 and the on resistance of the FET 61 may be minimized to allow significant load modulation to be applied.

In a conventional non-contact communication apparatus, an attempt to apply significant load modulation reduces power obtained by a power receiving circuit located inside the IC chip 40. Thus, the power fails to reach a value needed for operation of the IC chip 40, which stops operation. In contrast, in the embodiment of the present invention, even when the resistance of the resistor 62 and the on resistance of the FET 61 are minimized, the IC chip 40 does not stop operation as long as the clock signal can be retrieved from the clock retrieving section 81. This eases restrictions imposed when significant load modulation is to be applied. Therefore, the embodiment of the present invention allows significant load modulation to be applied. In the embodiment of the present invention, the aspect has been illustrated in which the magnitude Y (FIG. 2: H) of the load modulation applied by the load modulating section 60 is approximately nine times as large as the magnitude X (FIG. 2: A) of the load modulation applied by the reading apparatus (not depicted in the drawings). However, this is an example.

[Power Supply Section 70]

The power supply section 70 supplies power to the first detection section 20, the amplitude modulating section 30, and the second detection section 50. Therefore, the sections operate using power supplied by the power supply section 70.

As described above, the non-contact communication apparatus 1 according to the embodiment of the present invention allows the conventional IC chip 40 to be used without any change. Furthermore, the use of the power supply section 70 eliminates the need to transmit power to the IC chip 40. Moreover, significant load modulation can be applied, allowing for an increase in communication range.

The non-contact communication apparatus 1 will be described below in further detail.

[Clock Retrieving Section 81, Clock Apparatus 82]

The clock retrieving section 81 retrieves the clock signal (FIG. 2: C) from the signal received by the antenna section 10. The clock retrieving section 81 includes, for example, the differential amplifier 81a and a comparator 81b.

The clock apparatus 82 is an apparatus that generates and outputs the clock signal (FIG. 2: C). For example, a crystal oscillator can be used as the clock apparatus 82. The clock apparatus 82 is used because the clock retrieving section 81 outputs no clock signal when the clock apparatus 82 communicates with an external apparatus (not depicted in the drawings) such as a cellular phone or a smartphone instead of communicating with the reading apparatus (not depicted in the drawings).

[First Switch Section 91, Second Switch Section 92]

The first switch section 91 is a switch that switches between the clock retrieving section 81 and the clock apparatus 82. The first switch section 91 connects the clock retrieving section 81 and the amplitude modulating section 30 together when communicating with the reading apparatus (not depicted in the drawings) and connects the clock apparatus 82 and the amplitude modulating section 30 together when communicating with the external apparatus (not depicted in the drawings) such as a cellular phone or a smartphone. Thus, the amplitude modulating section 30 amplitude-modulates the clock signal (FIG. 2: C) retrieved from the clock retrieving section 81 when communicating with the reading apparatus (not depicted in the drawings) and amplitude-modulates the clock signal (FIG. 2: C) generated by the clock apparatus 82 when communicating with the external apparatus (not depicted in the drawings).

The second switch section 92 is a switch that switches between the first detection section 20 and the external apparatus (not depicted in the drawings) such as a cellular phone or a smartphone. The second switch section 92 connects the first detection section 20 and the amplitude modulating section 30 together when communicating with the reading apparatus (not depicted in the drawings) and connects the external apparatus (not depicted in the drawings) and the amplitude modulating section 30 together when communicating with the external apparatus (not depicted in the drawings). Thus, the amplitude modulating section 30 amplitude-modulates the clock signal (FIG. 2: C) using the first detection signal output from the first detection section 20 when communicating with the reading apparatus (not depicted in the drawings) and amplitude-modulates the clock signal (FIG. 2: C) with a signal input from the external apparatus (not depicted in the drawings) when communicating with the external apparatus (not depicted in the drawings).

The first switch section 91 and the second switch section 92 may be interlocked with each other according to an intended use.

[Variation]

The second detection section 50 is configured to be connectible to the external apparatus (not depicted in the drawings) such as a cellular phone or a smartphone. When the second detection section 50 communicates with the external apparatus (not depicted in the drawings), the second detection signal output from the second detection section 50 is input to the external apparatus (not depicted in the drawings).

In the non-contact communication apparatus according to the embodiment of the present invention, the first switch section 91, the second switch section 92, the current buffer 31*a*, the AND input current buffer 32*a*, the inverting current buffer 31*b*, and the inverting AND input current buffer 32*b* may be configured using, for example, FPGAs (Field Programmable Gate Arrays).

The embodiment of the present invention has been described. However, the description relates to an example of the present invention. The present invention is not limited by the description.

REFERENCE SIGNS LIST

1 Non-contact communication apparatus
10 Antenna section
11 Antenna coil
12 Capacitor
20 First detection section
21 Amplifier
22 Detection diode
23 Resistor
24 Capacitor
25 Capacitor
26 Comparator
30 Amplitude modulating section
31*a* Current buffer
32*a* AND input current buffer
33*a* Resistor
34*a* Resistor
31*b* Inverting current buffer
32*b* Inverting AND input current buffer
33*b* Resistor
34*b* Resistor
40 IC chip
50 Second detection section
51*a* Rectifier diode
51*b* Rectifier diode
52 Resistor
53 Capacitor
54 Capacitor
55 Comparator
60 Load modulating section
61 FET
62 Resistor
70 Power supply section
81 Clock Retrieving Section
81*a* Differential amplifier
81*b* Comparator
82 Clock apparatus
91 First switch section
92 Second switch section

The invention claimed is:

1. A non-contact communication apparatus connectable to an Integrated Circuit (IC) chip, comprising:
an antenna section configured to receive a signal from a reading apparatus;
a first detection section that retrieves a first detection signal from the signal received by the antenna section;
an amplitude modulating section that amplitude-modulates a clock signal using the first detection signal retrieved by the first detection section and that outputs the amplitude-modulated signal to the IC chip without involving any antenna;
a second detection section that retrieves a second detection signal from an output signal from the IC chip;
a load modulating section that load-modulates a carrier retrieved from the antenna section using the second detection signal retrieved by the second detection section and that inputs the load-modulated carrier to the antenna section; and
a power supply section that supplies power to the first detection section, the amplitude modulating section and the second detection section,
wherein the power supply section is a battery, and
wherein the first detection section, the amplitude modulating section and the second detection section operate using power supplied by the power supply section.

2. The non-contact communication apparatus according to claim 1, wherein the amplitude modulating section is a differential circuit.

3. The non-contact communication apparatus according to claim 1, further comprising a switch that switches between the first detection section and an external apparatus.

4. The non-contact communication apparatus according to claim 2, further comprising a switch that switches between the first detection section and an external apparatus.

* * * * *